(12) United States Patent
Kitagawa

(10) Patent No.: US 6,502,851 B2
(45) Date of Patent: Jan. 7, 2003

(54) ATTACHMENT STRUCTURE OF PASSENGER SIDE AIRBAG DEVICE

(75) Inventor: Motonobu Kitagawa, Tokyo (JP)

(73) Assignee: Takata Corporation, Tokyo (JP)

(*) Notice: Subject to any disclaimer, the term of this patent is extended or adjusted under 35 U.S.C. 154(b) by 0 days.

(21) Appl. No.: 09/847,646

(22) Filed: May 3, 2001

(65) Prior Publication Data
US 2001/0040365 A1 Nov. 15, 2001

(30) Foreign Application Priority Data
May 11, 2000 (JP) .................................. 2000-138913

(51) Int. Cl.⁷ .............................................. B60R 21/20
(52) U.S. Cl. ................................. 280/728.2; 280/732
(58) Field of Search ........................ 280/728.2, 728.3, 280/732

(56) References Cited

U.S. PATENT DOCUMENTS

| | | | | |
|---|---|---|---|---|
| 5,303,951 A | * | 4/1994 | Goestenkors et al. | 280/728.3 |
| 5,460,400 A | * | 10/1995 | Davidson | 280/728.2 |
| 5,564,732 A | * | 10/1996 | Bauer et al. | 280/728.3 |
| 5,735,542 A | * | 4/1998 | Bohn | 280/728.2 |
| 5,851,023 A | * | 12/1998 | Nagata et al. | 280/728.2 |
| 5,868,419 A | * | 2/1999 | Taguchi et al. | 280/728.3 |
| 5,887,891 A | * | 3/1999 | Taquchi et al. | 280/728.2 |
| 6,010,146 A | * | 1/2000 | Otsuka et al. | 280/728.2 |
| 6,039,342 A | * | 3/2000 | Sasaki | 280/728.3 |
| 6,076,851 A | * | 6/2000 | Davis et al. | 280/728.2 |

FOREIGN PATENT DOCUMENTS

| | | | | |
|---|---|---|---|---|
| EP | 0 823 353 A1 | * | 2/1998 | |
| EP | 0 904 994 A1 | * | 3/1999 | |
| JP | 7-117609 | | 5/1995 | |
| JP | 8-225049 | * | 9/1996 | |
| JP | 9-20202 A | * | 1/1997 | |
| JP | 9-183351 A | * | 7/1997 | |
| JP | 9-240408 A | * | 9/1997 | |
| JP | 11-34782 A | * | 2/1999 | |

* cited by examiner

Primary Examiner—Paul N. Dickson
Assistant Examiner—Ruth Ilan
(74) Attorney, Agent, or Firm—Kanesaka & Takeuchi (57) ABSTRACT

A passenger side airbag device is attached to a rear side of an instrument panel having a first attachment member on the rear side. A plate is attached to the rear side of the instrument panel and has a second attachment member at a side opposite to the first attachment member. The airbag device includes a container having first and second side faces facing oppositely, a coupling member disposed on the first side face of the container for coupling the container to the first attachment member of the instrument panel, and a fixing member disposed on the second side face of the container for fixing the container to the second attachment member. The container is fixed to the instrument panel by fixing the fixing member to the plate after coupling the coupling member to the instrument panel.

7 Claims, 9 Drawing Sheets

Fig. 12
Prior Art ive objects and advantages of the invention will be

ATTACHMENT STRUCTURE OF PASSENGER SIDE AIRBAG DEVICE

BACKGROUND OF THE INVENTION AND RELATED ART STATEMENT

The present invention relates to a structure for attaching a passenger side airbag device to a hidden side of an instrument panel.

In a conventional passenger side airbag device, an airbag in a folded state is accommodated within a canister-like container, which is sometimes referred to as a "retainer", and the front opening of the container or retainer is covered by a lid. Disposed at the bottom of the container is an inflator or gas generator for inflating the airbag. The lid is composed of a covering member separated from an instrument panel or composed of a certain area in the instrument panel defined by tear lines.

Figure 12:
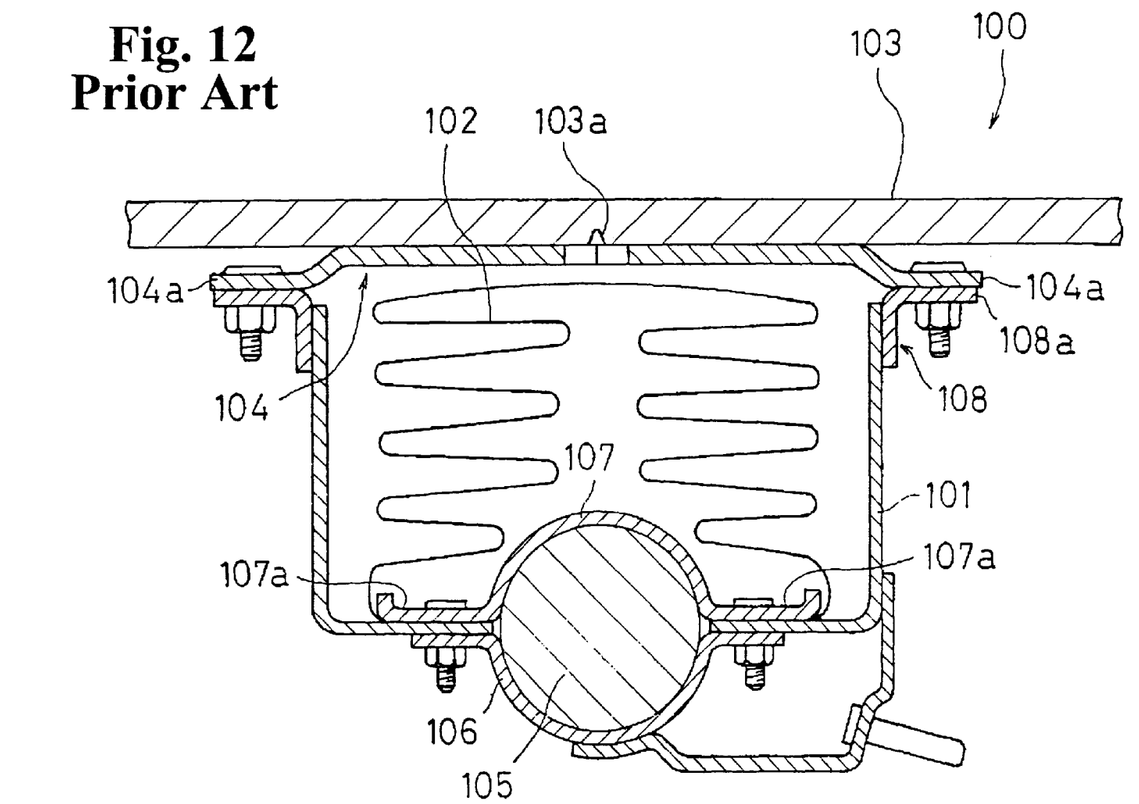
FIG. 12 is a sectional view showing a conventional passenger side airbag device and the structure for attaching the passenger side airbag device to the instrument panel.

Referring to FIG. 12, a general structure of a passenger side airbag device will be described, which has a lid formed at a certain area in an instrument panel as mentioned above. FIG. 12 is a sectional view showing a conventional passenger side airbag device, and the structure for attaching the passenger side airbag device to an instrument panel.

The conventional passenger side airbag device 100 shown in FIG. 12 comprises a container 101 which has a rectangular shape in its plan view, an airbag 102 which is folded and accommodated in the container 101, an instrument panel 103 covering an opening of the container 101 at the upper side of the container 101, a plate 104 which is interposed between the opening of the container 101 and the instrument panel 103 to connect the container 101 to the instrument panel 103, and an inflator 105 which is substantially formed in a cylindrical shape and generates gas for inflating the airbag 102.

The instrument panel 103 is provided with tear lines or breakable portions 103a formed in the back surface thereof. The tear lines 103a define a certain area in the instrument panel 103 as the lid for covering the opening of the container 102.

The plate 104 is arranged behind the instrument panel 103 to extend along the certain area of the instrument panel 103. The plate 104 is integrated with the instrument panel 103 and has connecting pieces 104a formed around the periphery thereof for connecting the container 101 to the instrument panel 103.

Disposed at the bottom of the container 101 is a semi-cylindrical inflator receiving member 106. The inflator 105 is fitted in the inflator receiving member 106 and the upper half of the inflator 105 is held by a retaining member 107. The retaining member 107 has flanges 107a to be superposed on the bottom of the container 101. Clamped between the flanges 107a and the bottom of the container 101 is an edge portion of a gas inlet of the airbag 102. The flanges 107a and the receiving member 106 are fixed to the container 101 together by bolts and nuts.

Provided around the periphery of the opening of the container 101 are fixing members 108 to be fixed to the connecting pieces 104a. Each fixing member 108 has an overhung portion 108a which is formed to project from the outer periphery of the container 101 and to extend along the back surfaces of the connecting pieces 104a. The overhung portions 108a are provided with through holes (not shown) through which bolts or rivets are inserted.

The container 101 in which the airbag 102 in the folded state is accommodated is attached to the certain area of the instrument panel 103 as the lid from behind in such a manner that the overhung portions 108a of the fixing members 108 provided around the periphery of the opening of the container 101 are brought in contact with the connecting pieces 104a. The connecting pieces 104a and the overhung portions 108a are connected to each other by bolts or rivets, so that the container 101 and the instrument panel 103 are connected.

In the aforementioned passenger side airbag device 100, since the container 101 is securely fixed to the connecting pieces 104a all around the periphery of the opening by the fixing members 108 fixed to the periphery of the opening, it is hard to detach the container 101 from the instrument panel 103. Particularly, in a state that the container 101 and the instrument panel 103 are connected to each other to compose the passenger side airbag device 100 and the instrument panel 103 is mounted to a vehicle body, it is very hard, from a cabin of the vehicle, to detach the container from the instrument panel 103 without detaching the instrument panel 103 from the vehicle body, for example, for maintenance of the passenger side airbag device 100. In particular, it is significantly hard to cancel the connection between the connecting piece 104a and the fixing member 108 of the container 101 at the windshield side, i.e. front side of the vehicle body, without detaching the instrument panel 103 from the vehicle body.

It is an object of the present invention to resolve the aforementioned problem and to provide a passenger side airbag device, wherein a container can be easily attached to and detached from an instrument panel and still can be detached from the instrument panel even when the instrument panel is mounted to a vehicle body.

It is another object of the invention to provide a structure for attaching the passenger side airbag device to the instrument panel.

Further objects and advantages of the invention will be apparent from the following description of the invention.

SUMMARY OF THE INVENTION

A passenger-side airbag device of the present invention comprises a container having at least a pair of oppositely facing side faces, and an airbag which is folded and accommodated in the container. The container has a coupling member disposed on one of the pair of the side faces for coupling the container to an instrument panel, and a fixing member on the other one of the pair of the side faces for fixing the container to the instrument panel.

In the structure for attaching the passenger side airbag device of the present invention, the aforementioned passenger side airbag device is attached to a hidden side of the instrument panel.

In the structure for attaching the passenger-side airbag device according to the present invention, the coupling member is preferably positioned at the front side or one side of a vehicle, the coupling member is a hook or an aperture, and the instrument panel is provided with an engaging member which is an aperture or a hook. The engagement between the coupling member and the engaging member is achieved by inserting the hook into the aperture. Further, in the structure for attaching the passenger side airbag device, it is preferable that the fixing member of the passenger side airbag device is detachably attached to the instrument panel.

According to the aforementioned structure, the passenger side airbag device of the present invention can be easily attached to the instrument panel by engaging the coupling member disposed on the side face of the container facing the front of the vehicle with the engaging member of the instrument panel, and then detachably fixing the fixing member disposed at the other side face opposite to the aforementioned side face to the instrument panel. On the other hand, the passenger side airbag device of the present invention can be easily detached from the instrument panel by releasing the fixing between the fixing member and the instrument panel and then pulling out the coupling member from the engaging member at the front side of the vehicle because the engagement between the coupling member and the engaging member is not fixed permanently. As a result, even when the passenger side airbag device is attached to the instrument panel and the instrument panel is mounted to a vehicle body, the passenger side airbag device can be detached from the instrument panel without detaching the instrument panel from the vehicle body. The detachment can be conducted from the cabin side.

DETAILED DESCRIPTION OF PREFERRED EMBODIMENTS

Figure 1:
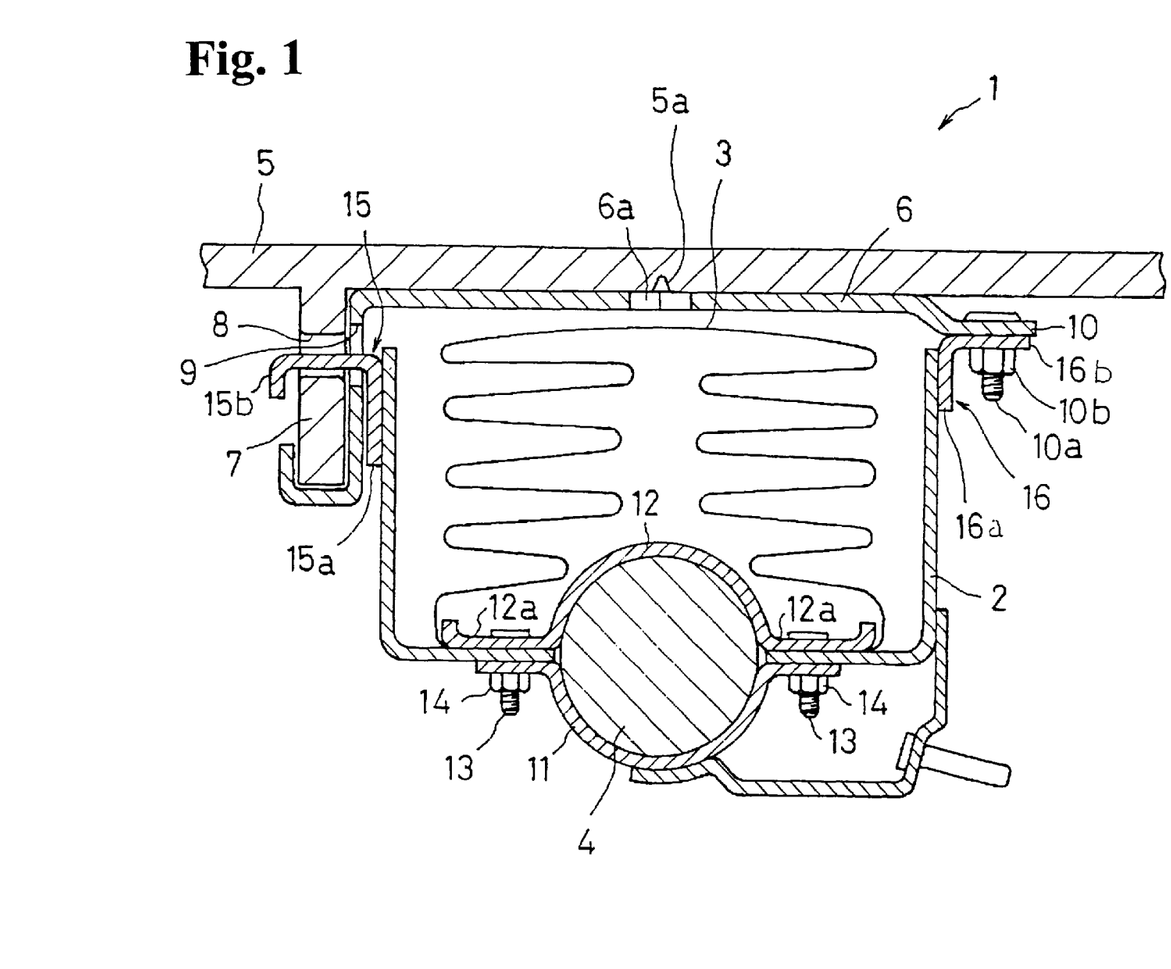
FIG. 1 is a vertical sectional view of a passenger side airbag device and a structure for attaching the passenger side airbag device according to an embodiment of the present invention.
Figure 2:
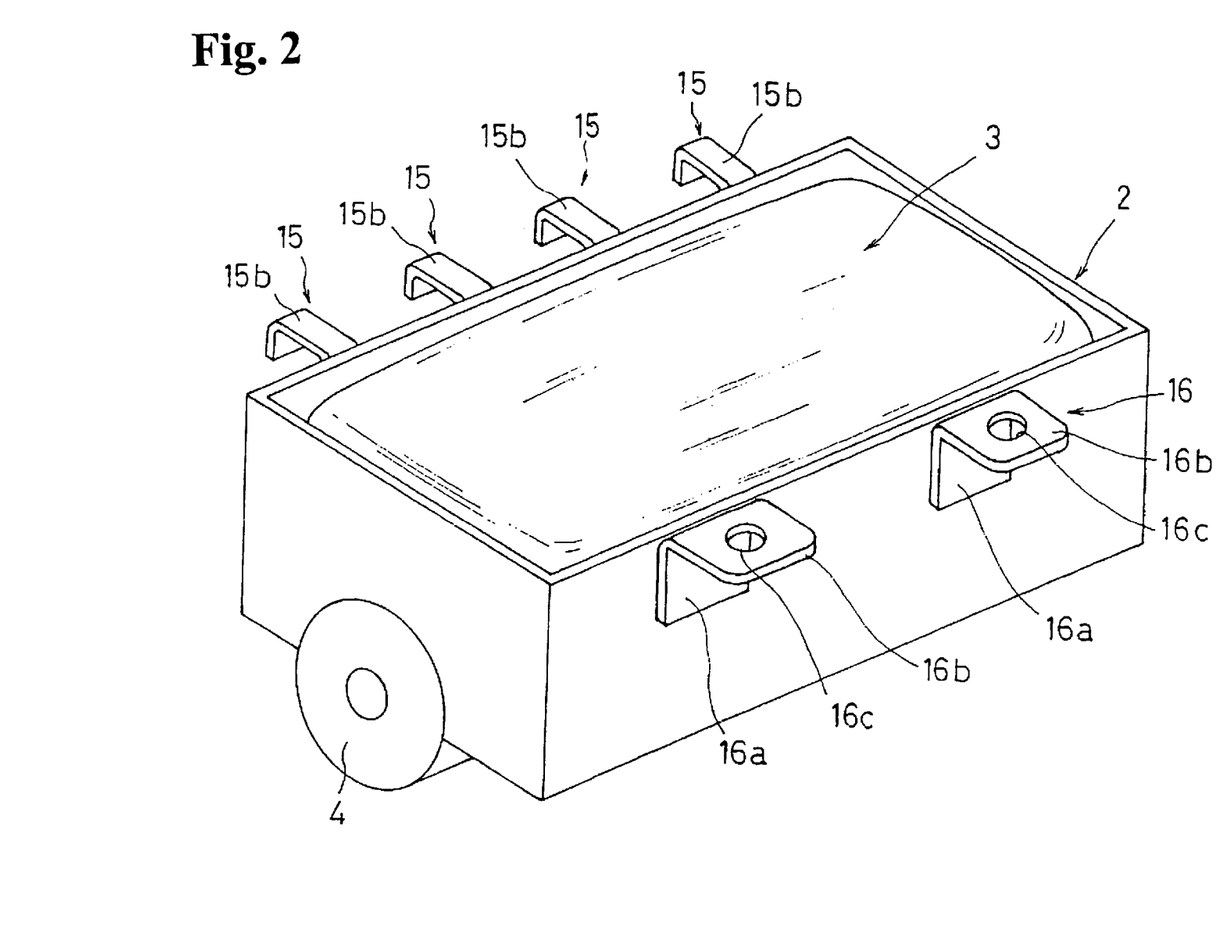
FIG. 2 is a perspective view of a container of the passenger side airbag device shown in FIG. 1.
Figure 3:
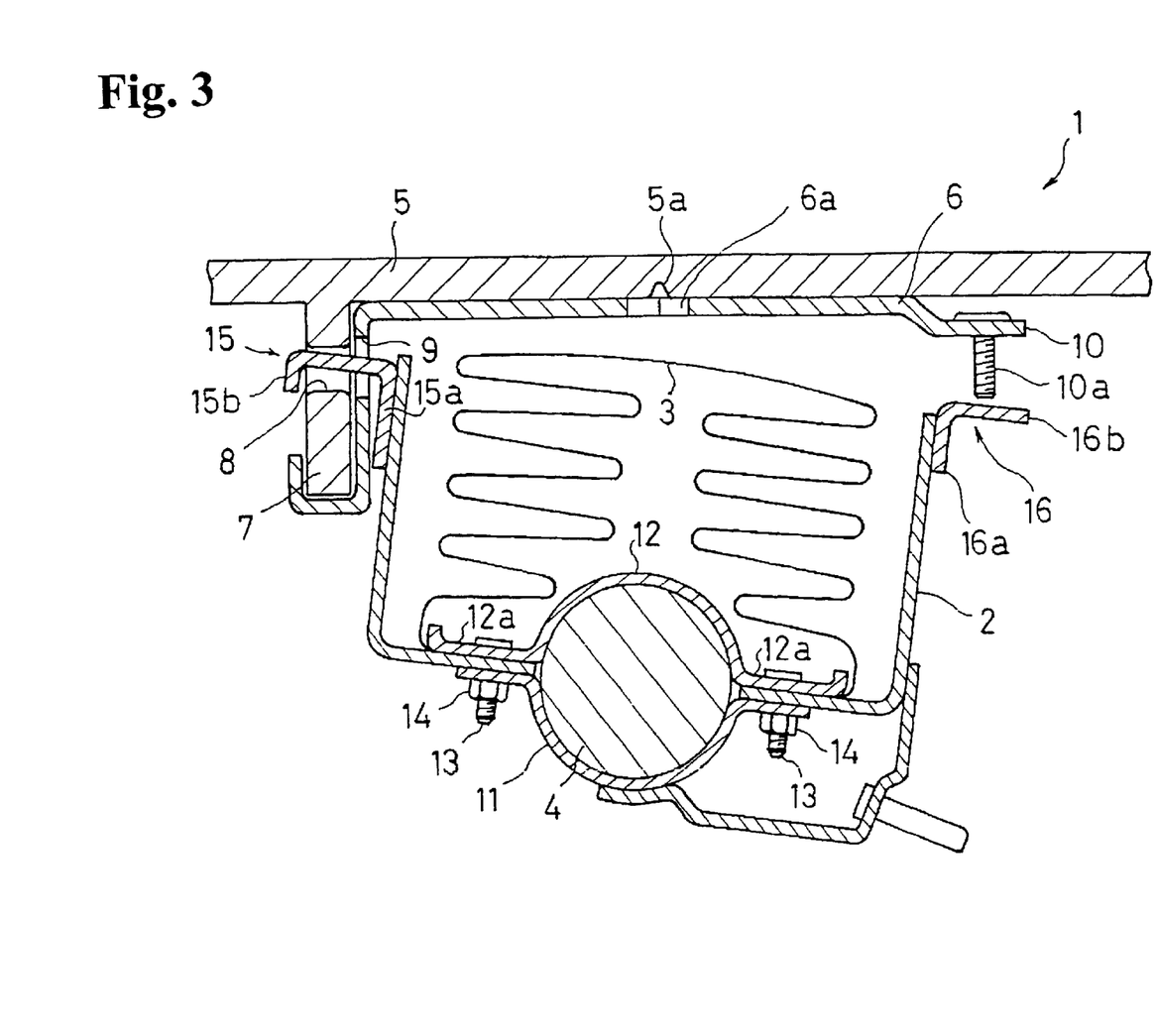
FIG. 3 is a sectional view showing a relation between the container of the passenger side airbag device shown in FIG. 1 and the instrument panel.

Hereinafter, embodiments of the present invention will be described with reference to the attached drawings. FIG. 1 is a vertical sectional view of a passenger side airbag device and the structure for attaching the passenger side airbag device to an instrument panel according to the embodiment of the present invention, FIG. 2 is a perspective view of a container of the passenger side airbag device taken from above, FIG. 3 is a sectional view showing a relation between the container of the passenger side airbag device and the instrument panel.

In this embodiment, a passenger side airbag device 1 comprises a container 2 which has a rectangular shape in its plan view, an airbag 3 which is folded and accommodated in the container 2, an inflator 4 which is formed substantially in a cylindrical shape and generates gas for inflating the airbag 3, an instrument panel 5 covering an opening of the container 2 at an upper side of the container 2, and a plate 6 which is interposed between the container 2 and the instrument panel 5 to connect the container 2 to the instrument panel 5.

The instrument panel 5 is provided with tear lines 5a formed in the back surface thereof. The tear lines 5a define a certain area of the instrument panel 5 as a lid for covering the opening of the container 2. The instrument panel 5 includes a wall portion 7 which is formed on the back surface thereof along a boundary of the certain area near a vehicle windshield side (front side) and extends parallel to a side face of the container 2. The wall portion 7 is formed with hook apertures 8 in which hooks 15, described later, of the container 2 are engaged.

The plate 6 made of metal is arranged behind the instrument panel 5 to extend along the certain area, as a lid, of the instrument panel 5, and is integrated with the instrument panel 5. An end portion of the plate 6 at the windshield side is bent to extend downwardly along a side face of the wall portion 7 on the certain area side, and then bent around the end of the wall portion 7 to extend along a portion of the other side face of the wall portion 7. The plate 6 is provided with through holes 9 formed in portions corresponding to the hook apertures 8 so as to allow the hooks 15 to be inserted into the hook apertures 8. The size of A each through hole 9 is larger than that of each hook aperture 8, so that the hook apertures 8 are exposed to the certain area side and the plate 6 does not touch the hooks 15 when the hooks 15 are engaged with the hook apertures 8.

An edge portion of the plate 6 at a side opposite to the side facing the wall portion 7 has a connecting piece 10 projecting for connecting the container 2 to the instrument panel 5. The connecting piece 10 has stud bolts 10a which are inserted into through holes 16c of fixing members 16, described later, of the container 2.

The connecting piece 10 is structured to allow the following installation. That is, for attaching the container 2 to the instrument panel 5, the hooks 15 of the container 2 are inserted into the hook apertures 8. After that, overhung portions 16b, described later, of the fixing members 16 are brought in contact with the connecting piece 10 such that the stud bolts 10a are inserted into the through holes 16c, and nuts 10b are then screwed onto the stud bolts 10a from the ends to fix the fixing members 16. In this manner, the connecting piece 10 cooperates with the hook apertures 8 to connect the container 2 to the instrument panel 5.

The plate 6 has a slit 6a at a portion corresponding to the tear line 5a. The plate 6 also has hinges (not shown) at peripheral edge portions thereof to allow the plate 6 to pivot about the hinges just like flaps. Therefore, when the airbag 3 is inflated to press the instrument panel 5 through the plate 6, the plate 6 is moved together with the aforementioned certain area of the instrument panel 5 and is opened toward the vehicle cabin integrally with the certain area of the instrument panel 5.

Disposed on the bottom of the container 2 is a semi-cylindrical inflator receiving member 11. The inflator 4 is fitted in the inflator receiving member 11 and the upper half of the inflator 4 is held by a retaining member 12. The retaining member 12 has flanges 12a to be superposed on the bottom of the container 2. Clamped between the flanges 12a and the bottom of the container 2 is an edge portion of a gas inlet of the airbag 3. The flanges 12a and the receiving member 11 are fixed to the container 2 together by bolts 13 and nuts 14.

On one side face extending in the longitudinal direction of the container 2, the hooks 15 are provided to be inserted into the hook apertures 8. Each hook 15 comprises a fixed portion 15a which extends along the one side face of the container 2 and is fixed to the container 2, and a claw portion 15b which extends from the upper edge of the fixed portion 15a toward the outside of the container 2 through the hook aperture 8 and has an end portion bent downwardly along the wall portion 7. The fixed portions 15a are fixed to the one side face of the container by spot welding, so that the hooks 15 are secured to the container 2. In this embodiment, four hooks 15 are provided along the upper edge of the one side face of the container 2.

On the other side face, opposite to the one side face, of the container 2, the fixing members 16 are provided which are fixed to the connecting piece 10. Each fixing member 16 comprises a fixed portion 16a which extends along the other side face of the container 2 and is fixed to the container 2, and the overhung portion 16b which extends from the upper edge of the fixed portion 16a toward the outside of the container 2 along the connecting piece 10. The overhung portion 16b includes the through hole 16c, into which the stud bolt 10a of the connecting piece 10 is inserted. In the same manner as the hooks 15, the fixed portions 16a are fixed to the other side face of the container by spot welding, so that the fixing members 16 are secured to the container 2. In this embodiment, two fixing members 16 are provided along the upper edge of the other side face of the container 2.

The container 2 in which the airbag 3 in the folded state is accommodated is attached to the aforementioned certain area, as the lid, of the instrument panel 5 from behind. To attach the container 2 to the instrument panel 5, the claw portions 15b of the hooks 15 are first inserted into the through holes 9 and the hook apertures 8, so that the hooks 15 and the hook apertures 8 are engaged and the one side face of the container 2 is disposed along the wall portion 7. Then, the container 2 is adjusted such that the overhung portions 16b of the fixing members 16 disposed on the other side face of the container 2 opposite to the one side face disposed along the wall portion 7, are brought in contact with the connecting piece 10 of the plate 6 in such a manner that the stud bolts 10a are inserted into the through holes 16c. Then, the nuts 10b are screwed onto the stud bolts 10a projecting from the back surfaces of the overhung portions 16 to fix the fixing members 16 to the connecting piece 10. In this manner, the attachment of the container 2 is completed.

In the passenger-side airbag device 1 installed behind the instrument panel 5 as mentioned above, the inflator 4 spouts gas in the event of vehicle collision so as to inflate the airbag 3. Then, the instrument panel 5 is torn along the tear lines 5a, so that the instrument panel 5 and the plate 6 are integrally opened due to the pressure, and the airbag 3 is therefore deployed largely into the vehicle cabin.

According to the passenger-side airbag device 1 having the aforementioned structure, the side face, arranged at the vehicle windshield side, of the container 2 is attached to the instrument panel 5 by a simple structure just composed of the engagement between the hooks 15 and the hook apertures 8, thereby facilitating the detachment of the container 2 from the instrument panel 5. The detachment is easily conducted by releasing the fixing between the fixing member 16 disposed on the other side face and the connecting piece 10, and pulling out the hooks 15 from the hook apertures 8. This enables such a passenger-side airbag device to allow easy detachment and attachment of the container in a state that the instrument panel remains mounted to the vehicle body, on the purpose of maintenance or the like.

Though the container 2 has the hooks 15 and two fixing members 16 disposed along the side face opposite to the side face disposed along the wall portion 7 in this embodiment, the number, positions, and arrangement of the fixing members 16 are not limited thereto. For example, one or three fixing members 16 may be available relative to the side face and further the fixing members 16 may be disposed on any of the other side faces besides the side face on which the hooks 15 are fixed.

The method of fixing the fixing members 16 of the container 2 to the connecting piece 10 is also not limited to the method as described in the above embodiment. For example, the connecting piece 10 may have internal thread portions instead of the stud bolts 10a, but not illustrated. In this case, the fixing members 16 are fixed to the connecting piece 10 by screwing bolts into the internal thread portions of the connecting piece 10 after the overhung portions 16b of the fixing members 16 are brought in contact with the connecting piece 10. The configurations shown in FIG. 4 through FIG. 8 may also be employed.

Hereinafter, alternative examples of the method of fixing the fixing members 16 to the connecting piece 10 as shown in FIG. 4 through FIG. 8 will be described. FIGS. 4, 5, 7 and 8 are partial sectional views showing variations of the method of fixing the fixing member to the connecting piece of the passenger side airbag device according to the embodiment. FIG. 6(a) is a partial sectional view showing a variation of the method of fixing the fixing member to the connecting piece of the passenger side airbag device according to the above embodiment, and FIG. 6(b) is a perspective sectional view of the main components.

Figure 4:
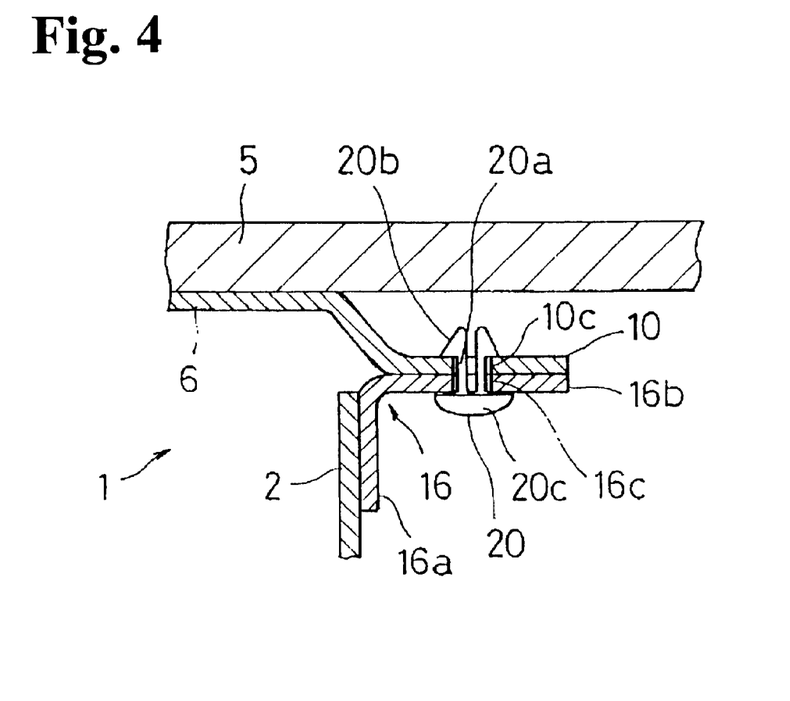
FIG. 4 is a partial sectional view showing a variation of a fixing member of the passenger side airbag device shown in FIG. 1.

The fixing member 16 shown in FIG. 4 is fixed to the connecting piece 10 by a pin 20. The connecting piece 10 and the fixing member 16 are provided with through holes 10c, 16c, respectively, into which the pin 20 is inserted.

The pin 20 has a pair of shaft halves 20a which are inserted into the through holes 10c, 16c. The shaft halves 20a are elastically deformable in a direction close to each other. Each shaft half 20a has a pawl 20b formed on an outer periphery of an end portion thereof, the pawl 20b being tapered toward its end. The diameter forming the ends of the shaft halves 20a provided with the pawls 20b is smaller than that of the respective through holes, while the diameter forming portions of the pawls 20b near the pin head is larger than the diameter of the respective through holes. While the shaft halves 20a are being inserted into the through holes, the shaft halves 20 are advanced and deformed in the direction close to each other so as to allow the pawls 20b to pass through the through holes. After the pawls 20b completely pass through the through holes, the shaft halves 20a are elastically returned to their original state. The pawls 20b after passing through the through holes contact at their bottoms with the peripheral edge of the through holes, so that the pin 20 is hard to come off the through holes.

The pin 20 is inserted into the through holes 16c, 10c from below the overhung portion 16b after the connecting piece 10 and the overhung portion 16b of the fixing member 16 are superposed on each other. The connecting piece 10 and the overhung portion 16b are held between the pin head 20c of the pin 20 and the bottoms of the pawls 20b, so that the fixing member 16 is fixed to the connecting piece 10. To cancel the fixing condition between the fixing member 16 and the connecting piece 10, the pin 20 is pulled out from the through holes by pulling the pin head 20c of the pin 20 downwardly with a large force.

Figure 5:
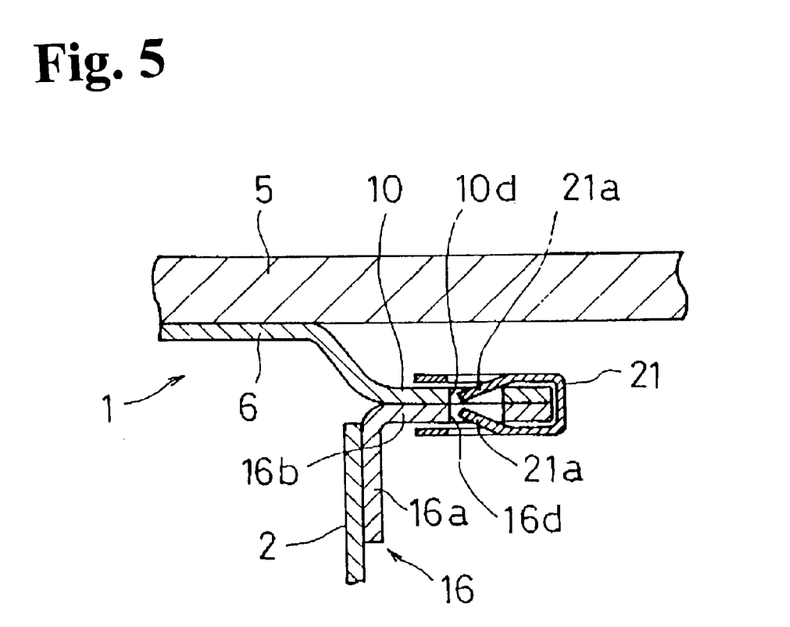
FIG. 5 is a partial sectional view showing a variation of the fixing member of the passenger side airbag device shown in FIG. 1.

The fixing member 16 shown in FIG. 5 is fixed to the connecting piece 10 by a clamping member 21 which clamps the overhung portion 16b and the connecting piece 10 together.

The clamping member 21 has a U-like section to extend from one outer surface of a superposed body composed of the connecting piece 10 and the overhung portion 16b of the fixing member 16 which are superposed on each other, through the end thereof, and to the other outer surface thereof. The clamping member 21 is detachably capped onto the superposed body, composed of the connecting piece 10 and the overhung portion 16b, at the end. The clamping member 21 has pawls 21a formed by cutting middle portions of a pair of leg pieces extending along the outer surfaces of the superposed body and bending the cut portions toward each other. The pawls 21a are elastically deformable. The pawls 21a are engaged with engaging holes 10d, 16d formed in the connecting piece 10 and the overhung portion 16b, respectively, so that the connecting piece 10 and the overhung portion 16b are hard to come off between the leg pieces of the clamping member 21. Of cause, because the pawls 21a are elastically deformable, the clamping member 21 can be removed from the superposed body composed of the connecting piece 10 and the overhung portion 16b by pulling the clamping member 21 with large force, thereby releasing the fixing condition between the fixing member 16 and the connecting piece 10.

Figure 6A:
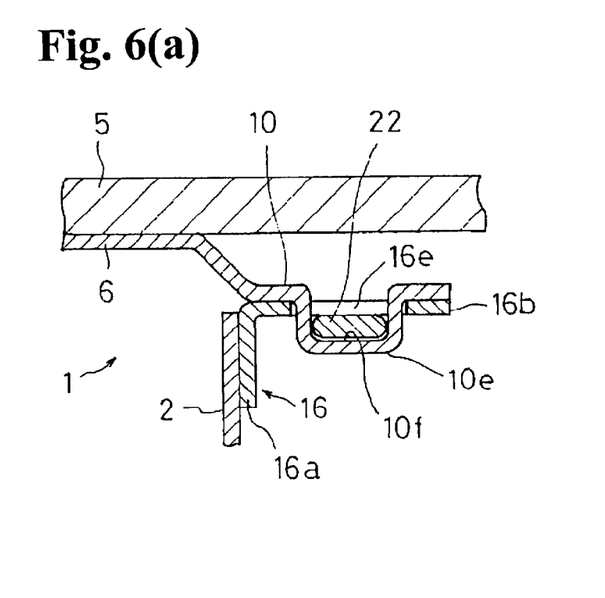
FIGS. 6(a) and 6(b) are explanatory views showing a variation of the fixing member of the passenger side airbag device shown in FIG. 1.
Figure 6B:
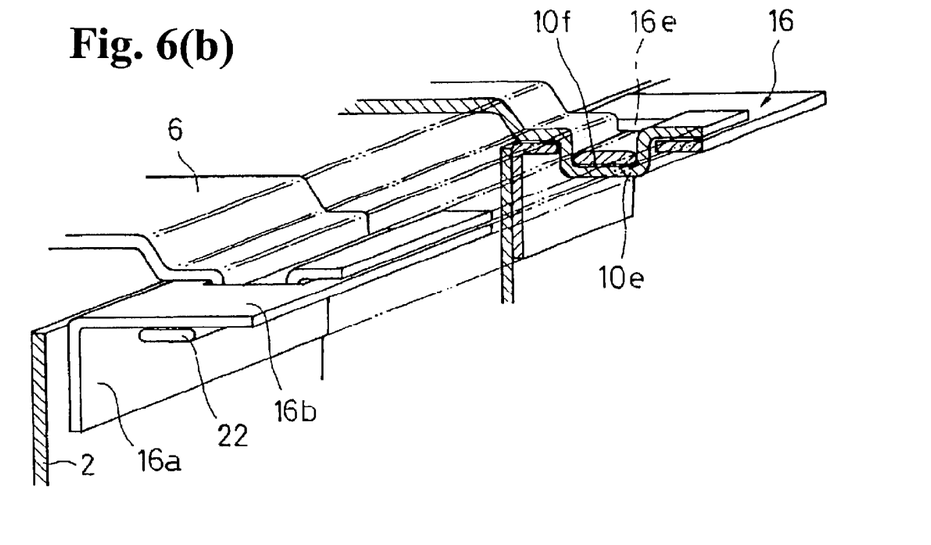

Referring to FIGS. 6(a) and 6(b), the connecting piece 10 has a ridge 10e which is formed at a middle portion thereof to extend toward the bottom. The ridge 10e is just like an undulation extending along the side wall of the container 2 and is formed by bending the middle portion of the connecting piece 10 into a groove-like shape to project downwardly from the connecting piece. Therefore, the upper side of the ridge 10e forms a groove 10f, into which a long flat bar plate 22 is fitted. The overhung portion 16b of the fixing member 16 has a fitting opening 16e, into which the ridge 10e is fitted. The overhung portion 16b is brought in contact with the connecting piece 10 in such a manner that the ridge 10e is fitted into the fitting opening 16e. When the ridge 10e is fitted in the fitting opening 16e, both ends of the groove 10f communicate with spaces below the overhung portion 16b, so that both ends of the plate 22 disposed on the bottom of the groove 10f project from the both ends of the groove 10f and extend along the back surface of the overhung portion 16b. Thus, the overhung portion 10e is prevented from coming off the fitting opening 16e.

The fitting opening 16e of the overhung portion 16b and the ridge 10e of the connecting piece 10 are fitted, and the plate 22 disposed on the bottom of the groove 10f at the upper side of the ridge 10e projects from the both ends of the groove 10f to extend along the back surface of the overhung portion 16b so as to prevent the ridge 10e from coming off the fitting opening 16e of the fixing member 16, whereby the fixing member 16 is fixed to the connecting piece 10. Of cause, the fixing member 16 can be removed from the connecting piece 10 by gripping one end of the plate 22 and pulling out the plate 22 along the back surface of the overhung portion 16b so as to release the engagement between the ridge 10e and the fitting opening 16e.

Figure 7:
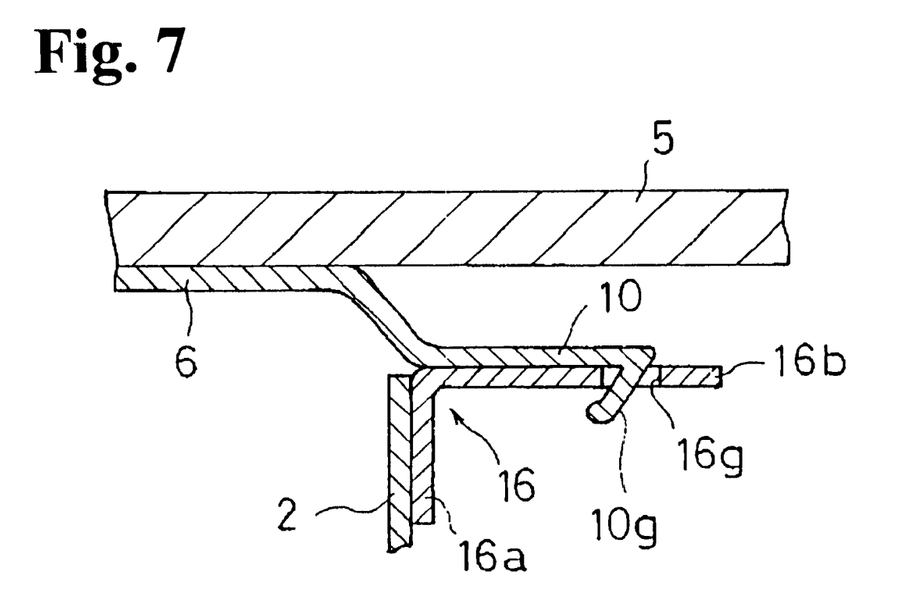
FIG. 7 is a partial sectional view showing a variation of the fixing member of the passenger side airbag device shown in FIG. 1.

Referring to FIG. 7, the connecting piece 10 is provided at its end with a claw portion 10g which is elastically deformable, while the fixing member 16 has an aperture 16g which is caught by the claw portion 10g. The claw portion 10g is formed integrally with the connecting piece 10. In this embodiment, the claw portion 10g is formed by bending an end portion of the connecting piece 10 into a claw-like shape. The claw portion 10g is designed such that the tip of the claw portion 10g is overlapped on a peripheral edge of the aperture 16g along the back surface of the overhung portion 16b of the fixing member 16 when the claw portion 10g is engaged with the claw portion 10g, whereby the claw portion 10g is hard to come off the aperture 16g.

The fixing member 16 is secured to the connecting piece 10 by engaging the claw portion 10g with the aperture 16g because of elastic deformation of the claw portion 10g. Of cause, the engagement between the claw portion 10g and the aperture 16g can be cancelled by elastic deformation of the claw portion 10g, thereby releasing the fixing between the fixing member 16 and the connecting piece 10.

Figure 8:
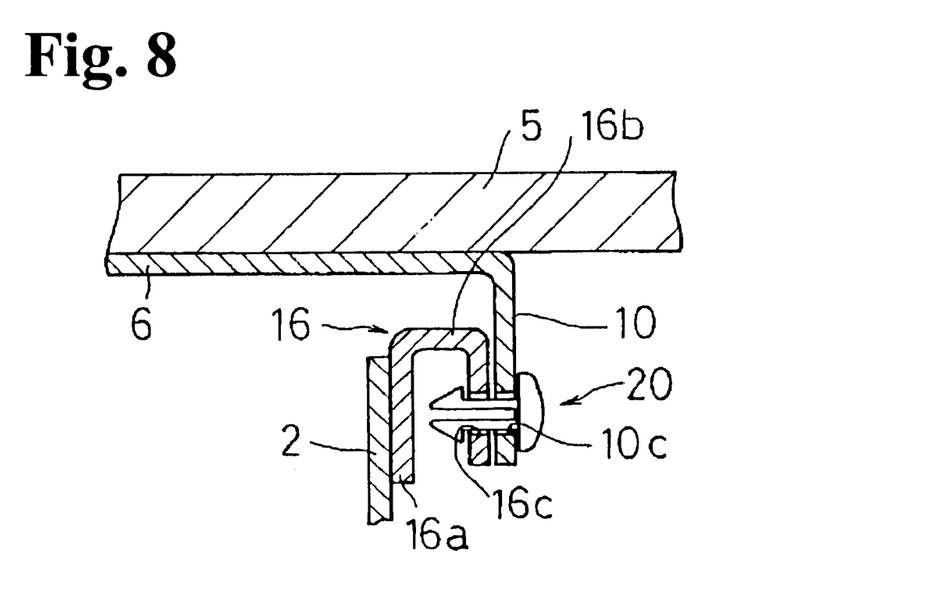
FIG. 8 is a partial sectional view showing a variation of the fixing member of the passenger side airbag device shown in FIG. 1.

As shown in FIG. 8, the connecting piece 10 may be formed in such a configuration as to extend from an edge of the plate 6 downwardly along the extending direction of the side face of the container 2. In this case, the fixing member 16 is formed in such a shape that the overhung portion 16b thereof is bent to extend downwardly along the connecting piece 10 after extending outwardly from the side face.

In the embodiment shown in FIG. 8, the connecting piece 10 and the overhung portion 16b are formed with through holes 10c, 16c, through which a pin 20 similar to that shown in FIG. 4 is inserted. The fixing member 16 is secured to the connecting piece 10 by superposing the connecting piece 10 and the overhung portion 16b on each other and inserting the pin 20 through the through holes 10c, 16c at the connecting piece 10 side. Of course, even with this configuration, the fixing condition between the fixing member 16 and the connecting piece 10 can be cancelled by pulling out the pin 20 from the through holes 10c, 16c with large force.

Figure 9:
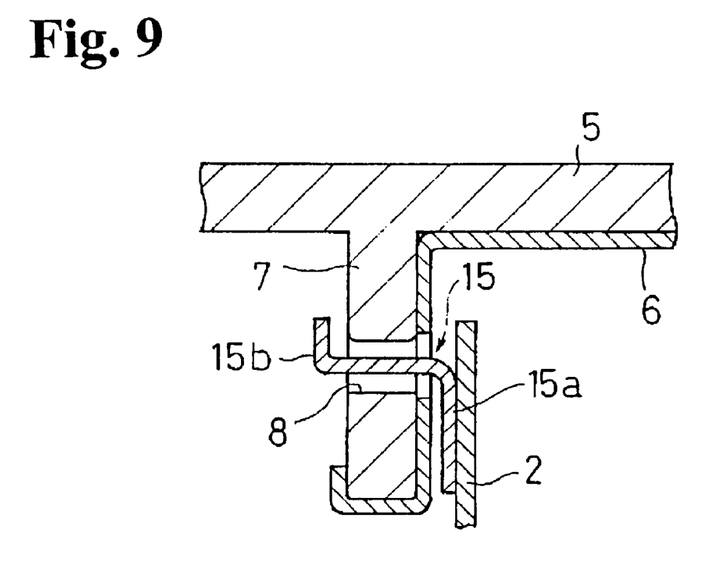
FIG. 9 is a partial sectional view showing a variation of a hook of the passenger side airbag device shown in FIG. 1.
Figure 10:
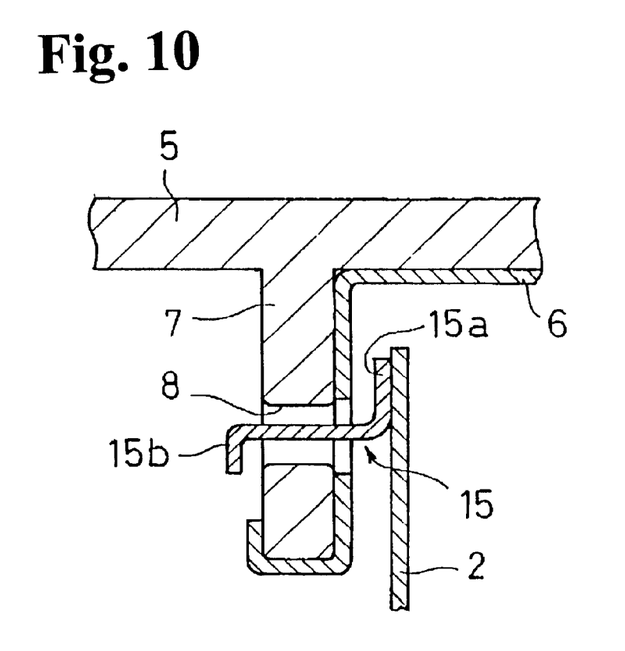
FIG. 10 is a partial sectional view showing a variation of the hook of the passenger side airbag device shown in FIG. 1.
Figure 11:
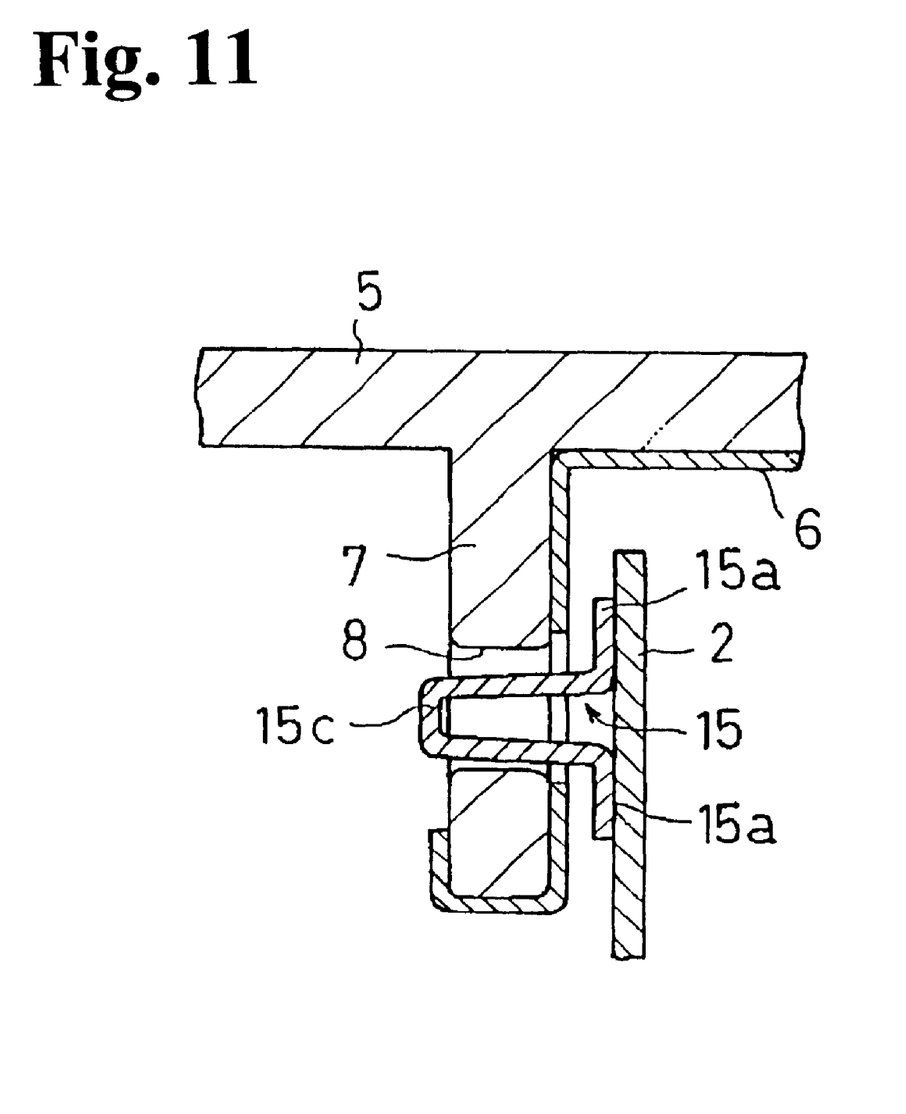
FIG. 11 is a partial sectional view showing a variation of the hook of the passenger side airbag device shown in FIG. 1.

The configuration of the hook 15 is not limited in the above embodiment. For example, the configurations shown in FIG. 9 through FIG. 11 may be employed. FIGS. 9 through 11 are partial sectional views showing variations of the hook 15.

In FIG. 9, the hook 15 comprises a fixed portion 15a which extends along the side face of the container 2 and is fixed to the container 2, and a claw portion 15b which extends from the upper edge of the fixed portion 15a toward the outside of the container 2 through the hook aperture 8 and has an end portion bent upwardly along the wall portion 7.

In FIG. 10, the hook 15 comprises a fixed portion 15a which extends along the side face of the container 2 and is fixed to the container 2, and a claw portion 15b which extends from the lower edge of the fixed portion 15a toward the outside of the container 2 and has an end portion bent downwardly along the wall portion 7.

In FIG. 11, the hook 15 comprises fixed portions 15a which extend along the side face of the container 2 and are fixed to the container 2, and a projection 15c which extends from a middle portion of the fixed portions 15a toward the outside of the container 2 so as to engage the hook aperture 8.

Even with the aforementioned configuration of the hook 15, the engagement between the hook 15 and the hook aperture 8 is made, and the undesired detachment of the container 2 from the instrument panel 5 is prevented.

As described above, in the passenger side airbag device and the structure for attaching the same according to the present invention, the container can be very easily attached to and detached from the instrument panel. Therefore, even when the instrument panel is mounted to the vehicle body, the container can be detached from the instrument panel without detaching the instrument panel from the vehicle body, for example, for maintenance of the airbag device.

While the invention has been explained with reference to the specific embodiments of the invention, the explanation is illustrative and the invention is limited only by the appended claims.

What is claimed is:

1. A structure for attaching a passenger side airbag device to an instrument panel, comprising:
    said instrument panel having a first attachment member on a rear side,
    a plate attached to the rear side of the instrument panel and having a second attachment member at a side opposite to the first attachment member, said second attaching member having a ridge portion projecting toward the container, and
    said passenger-side airbag device fixed to the rear side of the instrument panel and including:
        a container having first and second side faces facing oppositely,
        a coupling member disposed on the first side face of the container for coupling the container to the first attachment member of the instrument panel,
        a fixing member disposed on the second side face of the container for fixing the container to the second attachment member and having a flange fixed to the container and a hole formed in the flange, said ridge portion being located in the hole to completely pass through the flange, and
        a bar plate disposed in the ridge portion and located on a rear side of the flange so that the container is fixed to the instrument panel by fixing the fixing member to the plate after coupling the coupling member to the instrument panel.

2. A structure according to claim 1, wherein said coupling member is positioned at one side of a vehicle.

3. A structure according to claim 1, wherein said fixing member of said passenger side airbag device is detachably fixed to the instrument panel.

4. A structure according to claim 1, further comprising an airbag folded and accommodated in the container, and an inflator attached to the container to provide gas to the airbag.

5. A structure for attaching a passenger side airbag device to an instrument panel, comprising:
    said instrument panel having a first attachment member on a rear side,
    a plate attached to the rear side of the instrument panel and having a second attachment member at a side opposite to the first attachment member, said second attachment member having a claw portion, and
    said passenger-side airbag device fixed to the rear side of the instrument panel and including:
        a container having first and second side faces facing oppositely,
        a coupling member disposed on the first side face of the container for coupling the container to the first attachment member of the instrument panel, and
        a fixing member disposed on the second side face of the container for fixing the container to the second attachment member and having a flange fixed to the container and a hole formed in the flange, said claw engaging the hole so that the container is fixed to the instrument panel by fixing the fixing member to the plate after coupling the coupling member to the instrument panel.

6. A structure for attaching a passenger side airbag device to an instrument panel, comprising:
    said instrument panel having a wall portion on a rear side having a plurality of apertures forming a first attaching member,
    a plate attached to the rear side of the instrument panel and having a second attachment member at a side opposite to the first attachment member, and a portion extending along the wall portion and having holes overlapping the apertures, and
    said passenger-side airbag device fixed to the rear side of the instrument panel and including:
        a container having first and second side faces facing oppositely,
        a coupling member disposed on the first side face of the container for coupling the container to the first attachment member of the instrument panel so that the coupling member engages the apertures and holes of the instrument panel and the plate, and
        a fixing member disposed on the second side face of the container for fixing the container to the second attachment member so that the container is fixed to the instrument panel by fixing the fixing member to the plate after coupling the coupling member to the instrument panel.

7. A structure for attaching a passenger side airbag device to an instrument panel, comprising:
    said instrument panel having a first attachment member on a rear side,
    a plate attached to the rear side of the instrument panel and having a second attachment member at a side opposite to the first attachment member and a hole, and
    said passenger-side airbag device fixed to the rear side of the instrument panel and including:
        a container having first and second side faces facing oppositely,
        a coupling member disposed on the first side face of the container for coupling the container to the first attachment member of the instrument panel, and
        a fixing member disposed on the second side face of the container for fixing the container to the second attachment member and having a flange with a hole fixed to the second side face of the container, said holes of the flange and plate overlapping each other, and a clamping member for fixing the flange to the plate having a U-shaped section with pawls bent toward each other, said U-shaped section being disposed over the flange and plate so that the pawls are inserted into the holes, and the container is fixed to the instrument panel by fixing the fixing member to the plate after coupling the coupling member to the instrument panel.

* * * * *